May 22, 1951 B. M. WOJCIECHOWSKI 2,554,164

BRIDGE CIRCUITS

Filed Feb. 16, 1949 5 Sheets-Sheet 1

INVENTOR
B. M. WOJCIECHOWSKI
BY Walter M. Hill
ATTORNEY

INVENTOR
B. M. WOJCIECHOWSKI
BY Walter M. Hill
ATTORNEY

May 22, 1951 B. M. WOJCIECHOWSKI 2,554,164

BRIDGE CIRCUITS

Filed Feb. 16, 1949 5 Sheets-Sheet 3

INVENTOR
B. M. WOJCIECHOWSKI
BY Walter M. Hill
ATTORNEY

INVENTOR
B. M. WOJCIECHOWSKI
BY Walter M. Hill
ATTORNEY

INVENTOR
B. M. WOJCIECHOWSKI
BY Walter M. Hill
ATTORNEY

Patented May 22, 1951

2,554,164

UNITED STATES PATENT OFFICE 2,554,164

BRIDGE CIRCUITS

Bogumil M. Wojciechowski, New York, N. Y., assignor to Western Electric Company, Incorporated, New York, N. Y., a corporation of New York Application February 16, 1949, Serial No. 76,733

7 Claims. (Cl. 175—183)

This invention relates to bridge circuits and more particularly to an improvement in phase sensitive bridge balance detectors for alternating-current bridge circuits.

In prior art bridge detector circuits of the phase sensitive type, the reference potential is given a fixed phase relationship with respect to the voltage applied across the input terminals to the bridge. As this phase relation is a function of the measured impedance and frequency, these prior art phase discriminating circuits require the use of phase shifters which must be adjusted for different frequencies and impedance levels. Such adjustments require considerable time and are therefore an obvious disadvantage of these circuits. Also, the fact that such adjustments must be made introduces a source of error. Moreover, the variable phase shifters which must be used with such apparatus are usually quite complicated networks and their operation is often limited to a relatively narrow frequency range. These and other disadvantages of the prior art circuits are well known to those who have made use of them.

It is the object of this invention to overcome the aforesaid disadvantages by providing an improved circuit means for deriving the reference voltage for such detector systems.

It is another object of this invention to eliminate the complicated and costly adjustable phase shifter necessary in the prior art circuits and substitute for it a very simple phase adjusting means having no substantial frequency limitations.

It is a still further object of this invention to provide means for deriving the reference potential which is substantially self-adjustable within a considerable impedance range thereby eliminating the necessity for any adjustments whatever within this range.

The foregoing objects are achieved by this invention which provide a means for deriving the reference potential for phase detectors for alternating-current bridges which comprises a variable voltage control for connection to the source of alternating current supplying the bridge, an output circuit for this voltage control, a voltage subtraction circuit connected to this output circuit and also having a terminal for connection to one of the output terminals of the bridge, whereby a reference voltage is derived proportional to the vector difference between the potential of said voltage control output circuit and the potential of the bridge output terminal, a circuit for connecting the output terminals of the voltage subtraction circuit to one pair of input terminals of a phase sensitive detector, the other pair of input terminals of which are connected to the output terminals of the bridge.

The invention may be better understood by referring to the accompanying drawings in which:

Figs. 1 and 2 disclose in elementary form an impedance bridge and an admittance bridge to aid in illustrating the invention;

Figure 5:
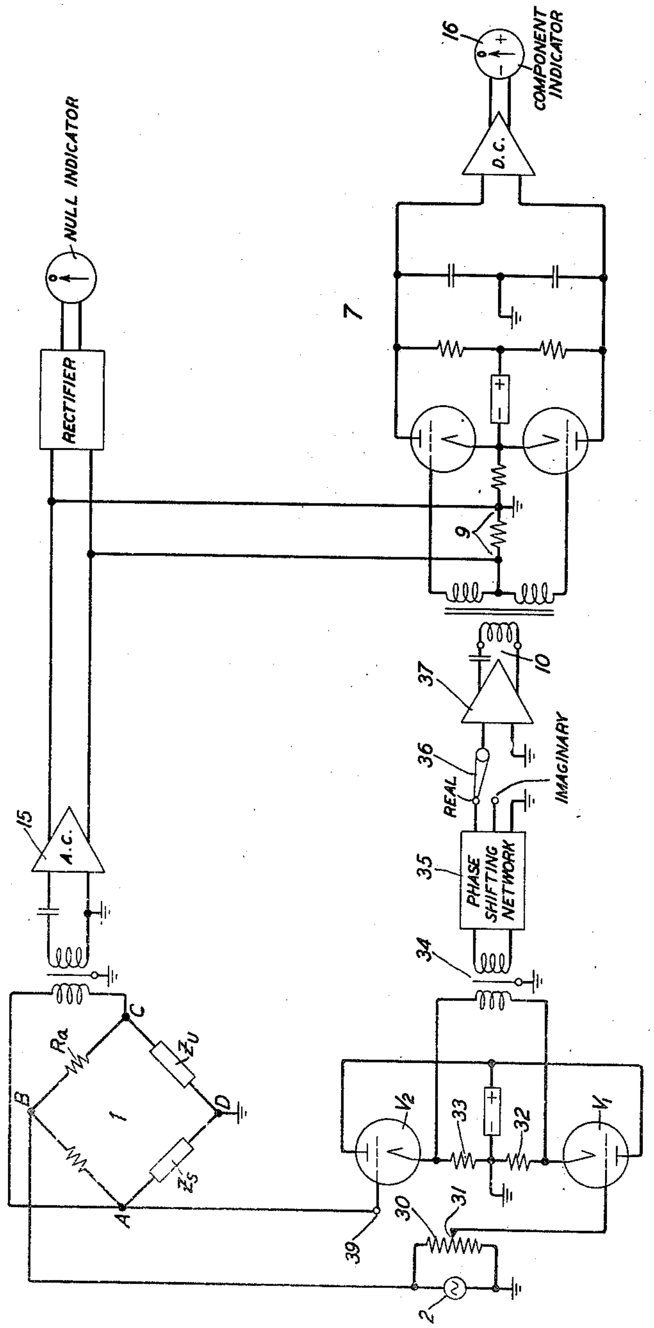
Fig. 5 shows an embodiment of the invention combined with a bridge of the type shown in Fig. 1 and a phase detector for separately indicating the two components of the unknown complex impedance being measured.
Figure 6:
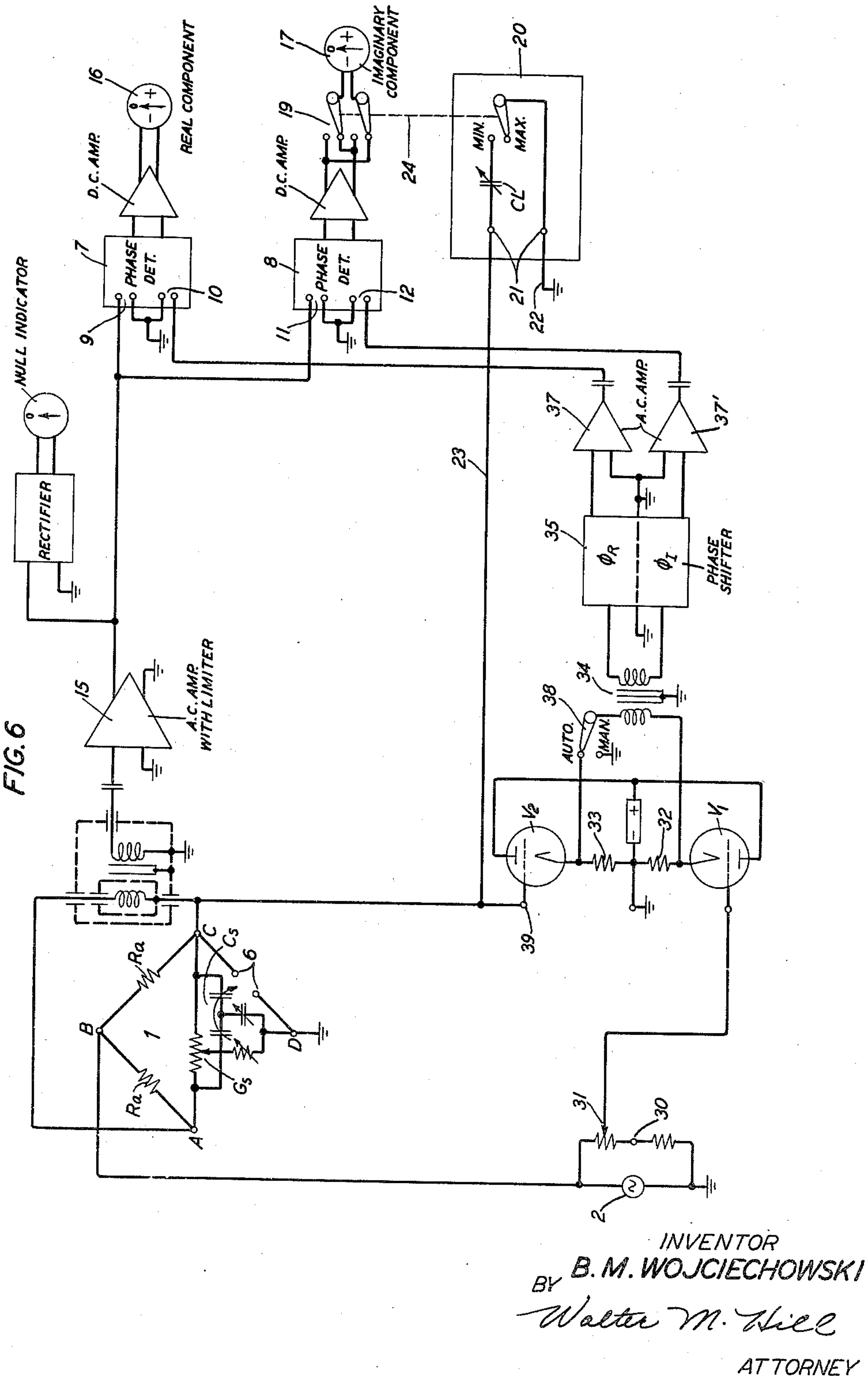
Figure 7:
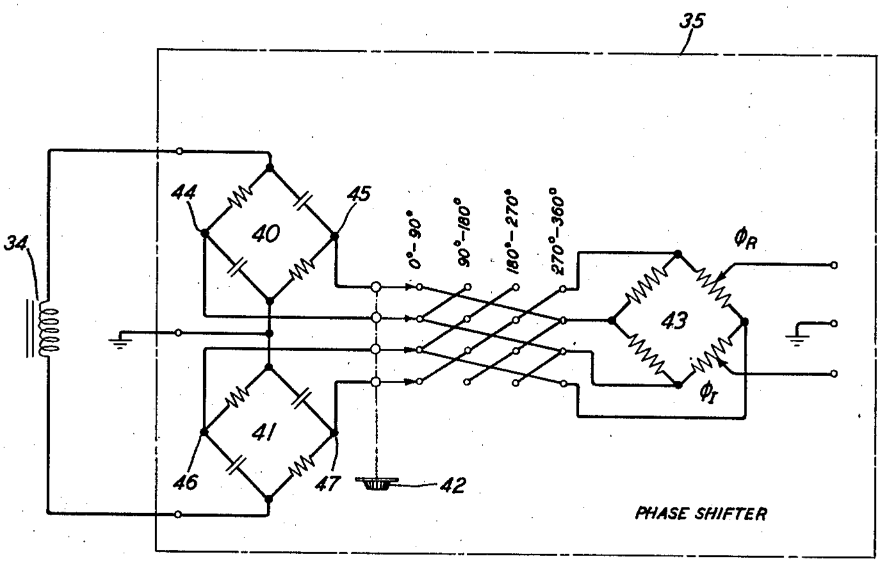
Figure 8:
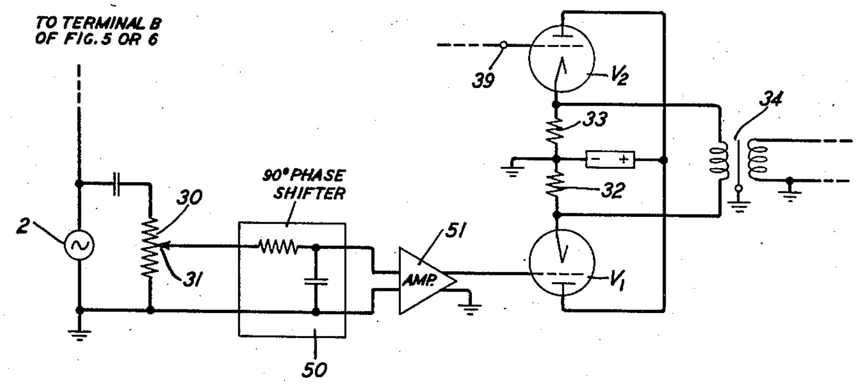

Fig. 6 discloses the invention applied to a different type of alternating-current bridge and in which both the real and imaginary components of the complex impedance are simultaneously indicated;

Fig. 7 discloses a balanced phase shift network which may be used in connection with the circuits of either Fig. 5 or Fig. 6; and Fig. 8 discloses an alternative circuit means for deriving the reference potential for either Fig. 5 or Fig. 6.

Figure 1:
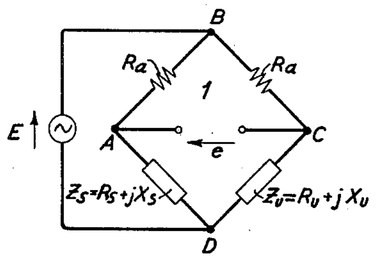

Referring now to Fig. 1 of the drawings, the reference numeral 1 denotes generally an alternating-current bridge of the comparison type for measuring impedances. This bridge is conventional and requires little description but briefly it has four terminals A, B, C and D. The ratio arms comprise equal resistors $R_a$, $R_a$. The standard impedance is connected in the A—D arm of the bridge while the unknown impedance $Z_u$ is connected in the C—D arm. The alternating-current power supply of voltage E is connected to the B and D terminals of the bridge. The output potential $e$ is derived from the output terminals A and C. Assuming the phase relationship between the input and output voltages as indicated by the arrows associated therewith on Fig. 1, the ratio of the output voltage to the input voltage for an infinite input impedance detector may be written as follows:

$$\frac{e}{E}=e'=\left[\frac{R_a}{R_a+R_s+jX_s}\right]\left[\frac{R_s+jX_s-R_u-jX_u}{R_a+R_u+jX_u}\right] \quad (1)$$

where: $R_a$, $R_s$, $R_u$, $X_s$ and $X_u$ are the resistances and reactances shown on Fig. 1.

A bridge of this type is very useful for measuring large numbers of similar elements. In this case the standard impedance $Z_s$ is kept fixed as to each of its components while the impedance elements to be tested are consecutively connected to the C and D terminals of the bridge. One very convenient way of constructing such a bridge is disclosed in applicant's copending application Serial No. 782,860, filed October 29, 1947. The invention of that application related to a limit bridge detector, one embodiment whereof is disclosed in Fig. 6 of this application which will be described in some detail later. It may be here stated, however, that the fundamental requirement of every phase detector is that variations of either component must independently affect the response of only one indicating instrument. For example, variations of the real component of impedance should affect only the real component indicator 16 of Fig. 6, whereas variations in the imaginary component should affect only the imaginary component indictor 17 of Fig. 6. Obviously, this could not be achieved if there is any substantial shift in phase of the reference voltage used with the phase detectors 7 and 8 of Fig. 6 due to variations in impedance level being measured.

When the standard impedance $Z_s$ of Fig. 1 is kept fixed, the quantity in the first bracket of the right-hand member of Equation 1 is a constant vector which may be expressed as follows:

$$V_c=\frac{R_a}{R_a+R_s+jX_s}=\frac{R_a[(R_a+R_s)-jX_s]}{(R_a+R_s)^2+X_s^2} \qquad (2)$$

The unit in which the voltage vector $V_c$ is expressed is in terms of volts per volt of applied voltage. This of course is evident from Equation 1 which expresses the output voltage $e'$ as volts output per volt of applied voltage. Equation 1, therefore, may be rewritten as follows:

$$e'=V_c\left[\frac{R_s+jX_s-R_u-jX_u}{R_a+R_u+jX_u}\right] \qquad (3)$$

As each test impedance $Z_u$ is removed and replaced by another test impedance, it will be evident that the balance condition of the bridge will change, depending upon whether or not the resistive component $R_u$ or the reactive component $X_u$ departs from the corresponding values of the standard impedance $Z_s$. Consequently, either one or the other component or both of the components $R_u$ and $X_u$ may vary. The relationship, both in magnitude and phase, of the output voltage with respect to the input voltage E is shown in Fig. 3.

Figure 3:
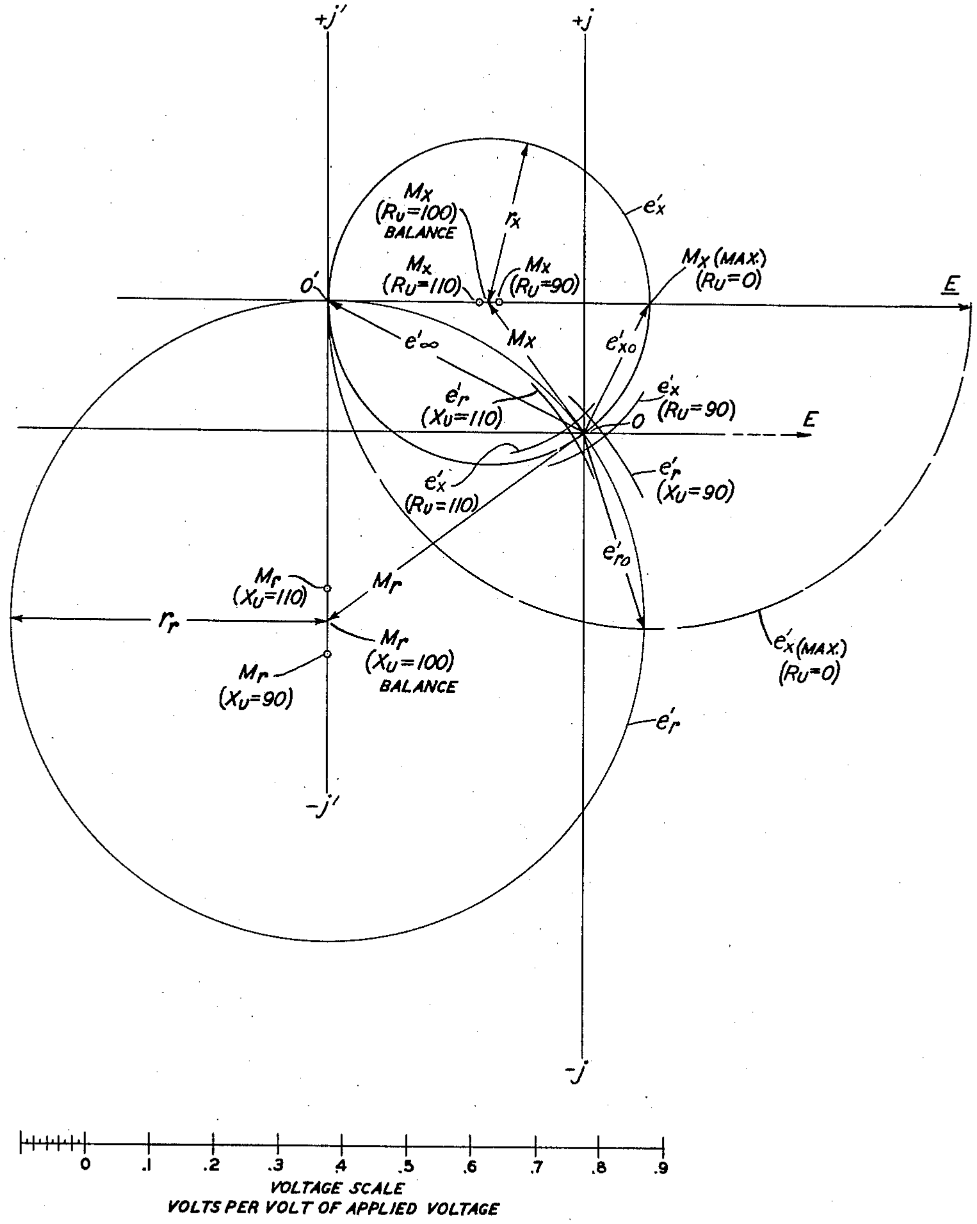
Fig. 3 is a vector diagram showing the circular loci of the voltage relationships for an alternating-current bridge of the type shown in Fig. 1.

In Fig. 3 the reference vector is the input voltage E. Two sets of axes are shown but for the moment only those that are passing through the origin O will be considered. The voltage scale is shown below the vector diagram and since it is in terms of volts per volt of applied voltage, the reference vector E will have a magnitude equal to 1 (unity). Actually, in Fig. 3 this vector has been shortened as its length with respect to origin O is of no particular significance to this analysis.

In order to construct the vector diagram of Fig. 3, it was necessary to assume definite values for the various parameters of Fig. 1. It was assumed that the ratio arm resistances $R_a$ were each 100 ohms as were also the standard resistance $R_s$ and reactance $X_s$. It is, therefore, evident that if the unknown resistance and reactance are also both equal to 100 ohms the bridge will be at complete balance and no output voltage will be obtained. This would correspond theoretically to a vector of zero magnitude emanating from the origin O. Obviously this would be only a point and would represent zero output voltage.

If it is assumed that the reactance $X_u$ of the unknown impedance $Z_u$ remains constant at 100 ohms and the resistance component $R_u$ varies, then the locus of the output voltages from the bridge in terms of volts per volt of applied voltage will be found on the circle $e'_r$ as shown in Fig. 3. For example, when the unknown resistance is zero, the output voltage is represented by the vector $e'_{r0}$. For values of unknown resistance $R_u$ between zero and 100 ohms, the point of this vector will move upwardly around circle $e'_r$ until it reaches its limiting condition at the balance point O. For values of unknown resistance $R_u$ greater than 100 ohms, the vector continues to move upwardly and to the left around circle $e'_r$ until it reaches its limiting condition at point O' which condition is reached when this resistance becomes infinite and is represented by the vector $e'_\infty$.

If instead of the unknown reactance remaining at 100 ohms it decreases to a fixed value of say 90 ohms, the locus of all output voltage vectors will follow the circle illustrated by the circular arc $$\underset{(X_u=90)}{e'_r}$$

The significance of these symbols is obvious when it is considered that the subscript refers to the variable parameter and the quantity in the parenthesis directly below the voltage symbol indicates that the reactive parameter of the unknown impedance is maintained at a fixed value of 90 ohms. While only a circular arc is shown in Fig. 3, this circle actually continues until it passes through the point O'. It has been shortened in this figure merely for the sake of clarity. It will be evident that under the new conditions assumed, a complete balance could not be achieved inasmuch as the reactive components will always be out of balance. Also for the sake of clarity, the output voltage vectors for this circular arc have not been shown. However, one condition is easily described. When the unknown resistance component becomes infinite in value, the output voltage is again represented by the vector $e'_\infty$. That this is so will become clearly evident if the several values of the parameters are introduced into Equation 3 and solved for the output voltage $e'$.

A similar analysis will show that the circle $e'_x$ is the locus of all output potentials in terms of volts per volt of applied voltage when the resistance component of the unknown impedance is maintained at 100 ohms and the reactive component $X_u$ is varied. This also can be shown mathematically by substituting the values in Equation 3. It will thus be seen that as the reactive component of the unknown impedance varies from the balance point of 100 ohms and decreases toward zero, the output voltage vector will move from its zero value at the origin O, around the circle $e'_x$, to its limiting condition shown by the vector $e'_{x0}$. Also when the reactance value increases from the balance point of 100 ohms at the origin O, the point of the arrow of this vector will follow the $e'_x$ circle until it reaches its other extreme limiting condition at point O'. It is thus evident that the vector $e'_\infty$ represents the output voltage of the bridge in volts per volt of applied voltage when either or both of the components of the unknown impedance becomes infinite. Consequently, the point O′ is a point through which all circular loci will pass for a bridge having equal ratio arms of 100 ohms and a standard impedance of 100+$j$100 ohms. It will also be observed from Equation 3 that when either or both of the unknown components within the bracket approach infinity, the quantity within the brackets approaches −1 so that the output voltage $e'$ becomes equal to $-V_c$. This of course leads to the conclusion that the voltage vector $V_c$ is equal to $-e'$ .

The circle diagram of Fig. 3 is constructed in accordance with the principles set forth in an article entitled "Cross potential of a four-arm network" by Anatoli C. Seletzky published in Electrical Engineering for December 1933, page 861. In accordance with the teachings of this article, Equation 3 may be rewritten as follows, assuming that the unknown resistance $R_u$ is a variable parameter.

$$e'_r=V_c\left[\frac{R_s+j(X_s-X_u)-R_u}{(R_a+jX_u)+R_u}\right]=V_c\left[\frac{\alpha+\beta\rho}{\gamma+\delta\rho}\right] \quad (4)$$

where $a=R_s+j(X_s-X_u)$ $\beta=-1$ $\gamma=R_a+jX_u$ $\delta=+1$ $\rho=R_u$

The radius of the circle $e'_r$ of Fig. 3 may be expressed as $$r_r=\left|V_c\frac{\alpha\varrho-\beta\gamma}{\delta\gamma_c-\delta\gamma_c}\right|=\frac{R_a}{2X_u} \quad (5)$$

wherein the vertical lines denote the absolute value and the subscripts $c$ denote the conjugates of the quantities to which they are attached.

The location of the center of the circle diagram for the same circle is defined by the following expression $$M_r=V_c\left[\frac{\alpha\varrho_c-\beta\gamma_c}{\gamma\delta_c-\gamma\delta_c}\right]=V_c\left[\frac{(X_s-2X_u)-j(R_a+R_s)}{2X_u}\right]$$
$$=-\frac{R_a(R_a+R_s)}{(R_a+R_s)^2+X_s^2}-j\frac{R_a}{2X_u}\left[\frac{(R_a+R_s)^2+X_s(X_s-2X_u)}{(R_a+R_s)^2+X_s^2}\right] \quad (6)$$

The real component of Equation 6 above shows that the horizontal location of the center point $M_r$ from the vertical axis is independent of either of the variables $R_u$ or $X_u$ and is dependent only on the parameters $R_a$, $R_s$ and $X_s$, that is the resistance of the ratio arms and the components of the standard impedance arm. As these are kept constant under the conditions assumed, the real component is, therefore, constant. It is, therefore, to be expected that the locus of all center points for all circular loci $e'_r$ will fall on a straight line parallel with the reactive axis $+j$, $-j$ and distant therefrom by an amount indicated by the real component of Equation 6. This is shown in Fig. 3 by the horizontal distance between the reactive axis $+j$ and $-j$ and the line $+j'$, $-j'$. The location of the center point, vertically, from the horizontal axis, however, is a function of the unknown variable reactance as shown by the imaginary component of Equation 6. Three such center points are shown on the line $+j'$, $-j'$ of Fig. 3. The one to which the center point vector $M_r$ is drawn is the point corresponding with the reactive component fixed at balance, that is, equal to 100 ohms. When the reactive component $X_u$ is increased ten per cent to 110 ohms or decreased ten per cent to 90 ohms, the center points move to the points shown on Fig. 3.

Similar considerations for the circle $e'_x$ also apply and the corresponding expressions are given below.

$$e'_x=V_c\left[\frac{(R_s-R_u+jX_s)-jX_u}{(R_a+R_u)+jX_u}\right]=V_c\left[\frac{\alpha+\beta\rho}{\gamma+\delta\rho}\right] \quad (7)$$

where $a=(R_s-R_u)+jX_s$ $\beta=-j$ $\gamma=(R_a+R_u)$ $\delta=+j$ $\rho=X_u$ $$r_x=\left|V_c\frac{\alpha\delta-\beta\gamma}{\delta\gamma_c-\gamma\delta_c}\right|=\frac{R_a}{2(R_a+R_u)} \quad (8)$$

$$M_x=V_c\left[\frac{\alpha\delta_c-\beta\gamma_c}{\gamma\delta_c-\delta\gamma_c}\right]$$
$$=V_c\left[\frac{X_s^2+(R_s-R_a-2R_u)(R_a+R_s)}{2(R_a+R_u)}+jX_s\right] \quad (9)$$

It is obserbed from Equation 9 that the imaginary component of the center point vector $M_x$ is independent of either of the components of the unknown impedance $R_u$ or $X_u$ and is dependent only on the resistances $R_a$ and $R_s$ and the reactance $X_s$. As these are constant, the imaginary component of this center point vector is also constant. Consequently, the locus of all the center points $M_x$ must lie on a straight line parallel with the horizontal axis and distant therefrom by the amount indicated by the imaginary component of Equation 9. The distance from the vertical axis will be determined by the real component of Equation 9 and is shown on Fig. 3 for three different values of the variable $R_u$.

Figure 2:
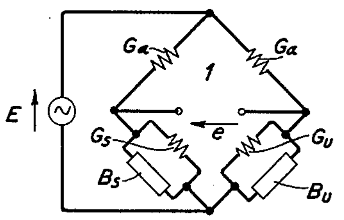

The foregoing analysis is sufficient for a thorough understanding of the circle diagram of Fig. 3. However, it may be pointed out at this time that somewhat simpler expressions are obtainable if the axes are shifted from the origin O to the new origin O′ as shown in Fig. 3. This is the point of intersection for all of the circular diagrams of this particular bridge. A similar point will be found for other bridges and it can be shown mathematically that the bridge of Fig. 2, for example, will have diagrams analogous to the diagrams already constructed for the bridge of Fig. 1. As is well known, all of the equations may be written with reference to the new origin O′ by simply subtracting from the original complex components of each expression, the components of the new origin. From Fig. 3 this will be found to be the components of the vector $e'_\infty$. As previously observed this vector is equal to $-V_c$. These new expressions with respect to the new origin O′ are especially useful for constructing the circle diagram of Fig. 3 and for convenience are given below.

$$\underline{e'}=V_c\left[\frac{R_a+R_s+jX_s}{R_a+R_u+jX_u}\right]=\frac{R_a}{R_a+R_u+jX_u} \quad (10)$$

$$\underline{r_r}=\frac{R_a}{2X_u}=r_r \quad (11)$$

$$\underline{M_r}=O-j\frac{R_a}{2X_u} \quad (12)$$

$$\underline{r_x}=\frac{R_a}{2(R_a+R_u)}=r_x \quad (13)$$

$$\underline{M_x}=\frac{R_a}{2(R_a+R_u)}+jO \quad (14)$$

The underscoring denotes that the quantity is measured with respect to the new origin O'.

Since the radii of the circles are expressed as absolute quantities by Equations 5 and 8, they are scalar quantities and remain unchanged by the transformation. This is shown by Equations 11 and 13. Equations 12 and 14 for the center point vectors, however, show considerable simplification over Expressions 6 and 9 and are much more convenient to use in constructing the circle diagram. In using Equations 10, 12 and 14, it must be clearly kept in mind that they define points with respect to the new origin O' rather than the original origin O.

Now if the measured impedance is changed to a different value and the bridge is balanced by readjusting the standard impedance, it can be shown that the vector diagram of Fig. 3 is still representative of the voltage relationships. However, it must be remembered that the two origins O and O' will be located differently for different impedance levels in accordance with Equation 2 since the voltage $e'_{\infty}$ is equal to $-V_c$. This relates to the two origins. By using the new origin O' as the reference point and employing the new Expressions 10 to 14 inclusive, the balance point is always located at a point O determined by the value of the vector $V_c$. This is demonstrated by Equation 10 when the components of the unknown impedance are made equal to those of the standard. Therefore, the balance point with respect to the new origin O' is independent of the unknown impedance, as it should be, and is dependent only upon the ratio arm resistances and the standard impedance.

The family of resistance circle diagrams will be centered about a plurality of centers ($M_r$) on the imaginary ($j'$) axis just as shown on Fig. 3 and these centers will be determined by Equation 12. Similarly, the family of reactance circle diagrams will have the points $M_x$ on the real axis as their centers, their locations being determined by Equation 14. It will thus be seen that if the new origin is used as the point of reference, the same circle diagrams shown are again representative of the output voltages at all impedance levels at which the bridge may be balanced. The impedance level at which balance occurs is changed by changing the standard impedance components but only the balance point shifts, the two families of circles remaining unchanged.

In accordance with this invention the reference voltage for the phase detector is obtained as the vector difference between a voltage derived from the bridge input voltage and the potential of one of the bridge output terminals. The significance of the vector diagram of Fig. 3 can best be seen by first referring to Fig. 5. In this figure, the bridge network 1 is of the same type disclosed in Fig. 1. Alternating-current power is supplied to the BD terminals of the bridge from a source 2. The unbalance output from terminals A and C of the bridge is transformer-coupled to an amplifier 15 and, after amplification, is rectified and observed by a null indicator. This null indicator circuit is of conventional form and indicates only complete balance, that is, when both components of the unknown impedance are equal to the corresponding components of the standard impedance. A phase detector circuit 7, also of conventional form, has two pairs of input terminals 9 and 10. As is well known, the two vacuum tubes in this phase detector circuit 7 act as rectifiers, one of them producing a direct-current output proportional to the vector sum of the voltages applied to terminals 9 and 10 and the other producing a direct-current output proportional to the vector difference between these two voltages. As the properties of such phase detectors are well known to those skilled in the art, further description thereof is believed unnecessary. The direct-current outputs from the two rectifier tubes of phase detector 7 are in opposition and this difference voltage is amplified by a direct-current amplifier and observed by the galvanometer 16. In some applications the output from phase detector 7 may be of sufficient magnitude to make the direct-current amplifier unnecessary.

The phase detector 7 is connected to the bridge network 1 by connecting the pair of input terminals 9 to the output terminals A and C of the bridge network through the amplifier 15. The other pair of phase detector terminals 10 are usually connected in prior art circuits directly to the source of supply voltage 2 through a suitable phase shifter in order to properly adjust the phase relationship to render the component indicator 16 sensitive to only one of the components of the unknown impedance. In accordance with this invention, however, the reference voltage is not obtained directly from the source of supply 2 but rather as a vector difference between a particular portion of this voltage and the potential of one of the output terminals of the bridge network 1. In Fig. 5 this desired proportion of supply voltage is obtained by means of a potentiometer 30 connected directly across the supply voltage source 2 and a slider 31 which is connected to the grid of tube $V_1$ in a voltage subtraction circuit. The grid of tube $V_2$ is connected to terminal 39 for connection to either terminal A or C of the bridge network 1. In Fig. 5 it is shown connected to the A terminal. In the voltage subtraction circuit of the type shown in Fig. 5, the output voltages across output resistors 32 and 33 are each proportional to the input voltages applied to their respective tube grids, both as to magnitude and phase. Consequently, the primary of transformer 34 will receive a voltage proportional to their vector difference, that is, proportional to the vector difference between the voltage at slider 31 and terminal A of the bridge network 1.

The secondary of transformer 34 is connected to a phase shifting network 35 which may be of any conventional form. The only requirements which have to be met by this phase shifter is that it be capable of providing a preliminary phase adjustment for any fixed phase shift existing in the various circuit elements throughout the testing system, especially in amplifiers 15 and 37. This network must also be capable of providing two voltages exactly 90 degrees apart in phase. One of these voltages will be applied to amplifier 37 by shifting switch 36 to the "Real" switch point and the other voltage will be obtained by moving switch 36 to the "Imaginary" switch point. In one position of switch 36 the component indicator 16 is rendered sensitive only to the real component of the unknown impedance while in the other position of the switch the indicator 16 is rendered sensitive only to the imaginary component of the unknown impedance. Once the phase shifting network 35 is adjusted, it will not require readjustment even though the impedance level of the bridge network 1 is changed. This will become more clear as the description of the invention proceeds further.

The reference voltage thus derived is amplified by amplifier 37 and applied to the input terminals 10 of the phase sensitive detector.

Figure 4:
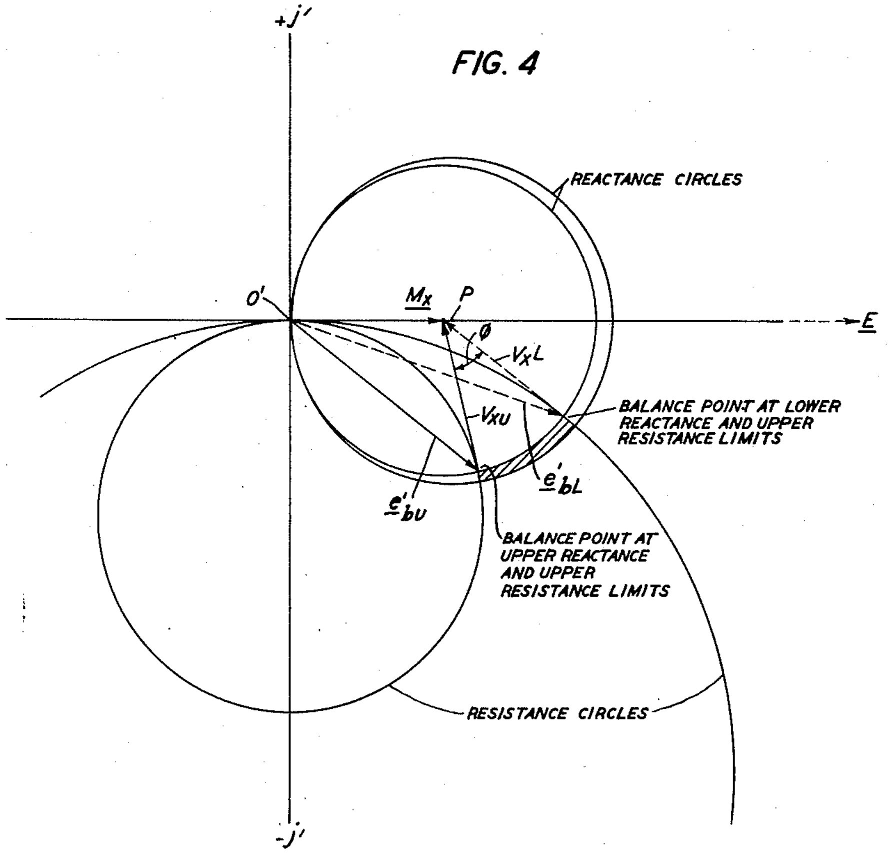
Fig. 4 is another vector diagram illustrating the vector relations for deriving the reference potential.

The manner of adjusting slider 31 of potentiometer 30 to achieve the object of this invention, is best understood by referring again to the vector diagram of Fig. 3 and Equations 12 and 14. It will be evident from Equation 10 that if both the resistive and the reactive components of the unknown impedance are made equal to zero, the output voltage of the bridge in terms of volts per volt of applied voltage, would be equal to unity. This, of course, is with respect to the new origin O'. Consequently, with respect to this origin O', the output voltage of the bridge is equal in both magnitude and phase to the applied voltage. This is shown on Fig. 3 by the vector $\underline{E}$ on the real axis passing through the new origin O'. In this connection it may be noted also that if the unknown reactive component is varied while the unknown resistive component is kept equal to zero, the output voltage in accordance with Equation 10 will follow the circle $e'_x$(max.) as shown in Fig. 3. The corresponding center point $M_x$(max.) will, in accordance with Equation 14, be equal to one-half of the applied voltage $\underline{E}$ as shown in Fig. 3. It will also be evident from Equation 14 that as the unknown resistance $R_u$ is varied from zero to infinity, the corresponding center points $M_x$ will vary from one-half to zero. Now the center point voltage $\underline{M_x}$ with respect to origin O' represents a simple, fractional, in-phase part of the applied voltage $\underline{E}$ and consequently the potential at slider 31 may be adjusted to equal this voltage. The potential of either point A or C (they are equal at balance) with respect to origin O' is the potential of the original origin O determined by the intersection of the circles $e'_x$ and $e'_r$ for the impedance level at which the bridge is balanced. This balance point potential with respect to origin O' is equal to voltage $-e'_\infty$. Physically, this is the voltage of bridge terminal A with respect to terminal B and can be shown to equal voltage $V_c$ defined by Equation 2. In Fig. 4, it is shown as the balance point potential $\underline{e'}_{bU}$. Taking the vector difference between the center point potential and this balance point potential with respect to the same axes yields the reference potential $V_{xU}$ of Fig. 4. This is in phase with and proportional in magnitude to, the output voltage from the subtraction circuit that is applied to the primary of transformer 34.

The reason for deriving this reference voltage in the manner indicated will become more clear from a further study of Figs. 3 and 4. The intersection of the circles at origin O determines the balance point potential for the particular impedance level at which the bridge is adjusted to balance. At balance, the reference voltage $V_{xU}$ passes through that center point $\underline{M_x}$ which corresponds to the balance condition. This voltage vector, therefore, is equal to the original $M_x$ vector, measured from the original origin O and is so shown in Fig. 3. Now it is a requirement for proper phase detector operation that the reference voltage be in phase with only one component of the bridge output voltage and in quadrature with the other component.

If the resistance component varies a small percentage from balance, it will produce a component of output voltage in substantial quadrature with that which will be produced by a reactance variation. This can be seen in Fig. 3 by observing that the tangents to the two circles are mutually perpendicular at the balance point O. Thus, if the phase detector receives a reference voltage exactly in phase with one component of output voltage due to an unbalance of one impedance component, the indicator will be sensitive only to variations of that impedance component and insensitive to variations of the other one. On the other hand, it can also be seen from Fig. 3 that if the reference voltage is fixed in phase with respect to the supply voltage, a large percentage variation of either one of the impedance components will shift the output voltage components considerably from their correct phase relation with the reference voltage and not only will the phase detector show an expected unbalance response to the out-of-balance component but it will also show a false response to the other one. Also, it can be seen that if the balance point is shifted by readjusting the standard to a new impedance level, the bridge output voltage components near the new balance point will be again shifted in phase with respect to the reference voltage established for the former balance point. This will also cause a false balance indication.

In the usual use of a phase detector, the aforedescribed false indications are corrected by readjusting the phase of the reference voltage whenever the measured impedance lever is changed. Of course that is also done in the operation of the apparatus of this invention, but in the prior art structure this has always required rather complicated phase adjusting means and at best the circuit elements were frequency sensitive and not only caused rather large phase shifts whenever the frequency was changed but were rather restricted as to usable frequency range.

In this invention the phase of the reference voltage is shifted by merely readjusting the slider 31. This changes the magnitude of $\underline{M_x}$ shown in Fig. 4. The simple potentiometer 30 is substantially free of any frequency sensitivity and hence the voltage derived therefrom will be constant in magnitude and phase over a wide frequency range. Because it is of substantially a pure resistance, it also has no practical limitations as to frequency range. This is a decided improvement in the means for adjusting the phase of the reference potential, in that it not only greatly simplifies the phase adjusting means but it also extends the frequency range over which the adjustments may be made.

It can also be shown that for the special case where the measuring range of one of the impedance components is relatively small compared with the resistance of a ratio arm, the reference potential does not require readjustment even though the other impedance component varies over a very wide range. This is not particularly obvious but becomes clear if one considers, for example, the case where the resistance component has a very restricted range as in the measurement of high Q reactors. From Equation 14 the following expression can be written.

$$\underline{M_x}=\frac{1}{2\left(1+\frac{R_o}{R_a}+\frac{R_m}{R_a}\right)} \qquad (15)$$

where $R_o+R_m=R_u$ $R_o$=residual bridge resistance $R_m$=the measured resistance In the above expression it can be seen that where $R_m$, the measured resistance, remains small compared to the resistance of the ratio arm $R_a$, the voltage $\underline{M}_x$ is very nearly constant. As a practical matter, very good results are obtained if the reference potential is not permitted to vary from its correct value by more than about two degrees. If a low sensitivity detector is used, this angle may be increased to as much as five degrees. By referring to Fig. 4, it will be noted that the circle diagrams of Fig. 3 have been redrawn to illustrate the automatic phase adjusting feature of this invention. The shaded area represents the measuring range of resistance and reactance. The narrow dimension thereof, included between the reactance circles, represents the amount of output voltage change due to a resistance variation of $R_m$ ohms. This is shown relatively small to represent the conditions required by Equation 15. The longer dimension between the resistance circles represents the change in voltage output due to reactance variation. Now assume the standard is adjusted to balance at the upper reactance and upper resistance limits. The vector difference between the voltage $\underline{M}_x$ and the balance point potential $\underline{e'}_{bU}$ would yield the reference voltage $V_{xU}$. The added subscript U denotes the reference vector for the upper reactance limit. The center point potential $\underline{M}_x$ will shift to point P if the resistance varies to its lower limit. This will be seen to cause only a very small change in phase of voltage $V_{xU}$ and consequently need not be corrected. However, the required reference voltage will shift through an angle $\Phi$ when the reactance varies to its lower limit. The shifted reference voltage will become $V_{xL}$, the subscript L denoting the lower reactance limit. Now it is clear that if the standard reactance is readjusted to balance this change in reactance, the balance point potential will also shift from $\underline{e'}_{bU}$ to $\underline{e'}_{bL}$. This can be shown by substituting $R_s+jX_s$ for $R_u+jX_u$ in Equation 10, remembering that this is the condition for balance. Consequently, the mere act of adjusting the standard reactance will automatically readjust the phase of the reference potential under the conditions specified. Hence, no manual adjustment will be necessary even though resistance $R_m$ is varied throughout its narrow range and the reactive component varies widely. This is a considerable practical advantage when measuring large quantities of similar kinds of circuit elements, such as air or mica condensers.

From the foregoing considerations it will now be evident that this invention has two distinct advantages over the prior art circuits. First, a simple potential divider of inherently wide frequency range is used to adjust the phase of the reference potential instead of the rather complicated phase shifter of restricted frequency range usually used. Second, where the measuring range of one of the components is narrow compared to the resistance of the ratio arm, no phase adjustment is necessary even though very wide variations of the other component take place.

It should be mentioned at this point that the voltage $\underline{M}_r$ can be used instead of $\underline{M}_x$ to derive the reference potential but it is not preferred for two reasons. First, it can be seen from Equation 12 that this voltage is subject to very wide variations as the reactance level varies. Even within practical limits it would often require almost impossible amplification of the supply voltage to obtain it. Second, because this voltage lies along the reactive axis, it is 90 degrees out of phase with respect to the supply voltage and consequently requires the use of a 90-degree phase shifter. Notwithstanding these limitations, there are cases where it can be used to advantage. For example, if the bridge is being used for measuring resistance elements at frequencies where the reactive variation is small with respect to the resistance of the ratio arm, substantially the same advantages can be realized as when measuring air or mica condensers as discussed above. In this case, Equation 12 is rewritten:

$$\underline{M}_r=-j\frac{1}{2\left[\frac{X_o}{R_a}+\frac{X_m}{R_a}\right]} \qquad (16)$$

where $X_o+X_m=X_u$ $X_o$=residual bridge reactance $X_m$=the measured reactance.

Here, as before, if the measured reactance $X_m$ is small compared with the ratio arm resistance $R_a$, the voltage $\underline{M}_r$ is substantially constant and hence the reference potential derived therefrom will remain substantially constant. A circuit structure employing this reference potential will be described later in connection with Fig. 8.

The circuit of Fig. 5 is very easily adjusted and operated. The bridge is brought to an initial complete balance (as indicated by the null indicator) at some desired impedance level. Obviously, the component indicator 16 should then show no deflection for either position of switch 36. If it does, it indicates an incorrect phase adjustment of the reference voltage. Slider 31 may be placed in its mid-position and the phase shifting network 35 adjusted to give zero deflection of indicator 16 for one position of switch 36. Then since the other position of switch 36 provides a reference voltage 90 degrees out of phase with the first one, no deflection should be noted for either position of switch 36. The apparatus is now adjusted for the selected impedance level and frequency. Other unknown impedances $Z_u$ may be substituted and one of the components, for example the real component of the standard impedance $Z_s$, is adjusted for minimum deflection on indicator 16. If the indicator 16 will not go to zero, it is because the reference voltage has shifted in phase due to a large change in impedance level. The phase is adjusted by merely moving slider 31 to obtain zero deflection. Then by switching 36 to the imaginary component, a reference voltage 90 degrees from the first one is provided and the imaginary component can be immediately adjusted to zero by adjusting the reactance component of the standard impedance $Z_s$. It should be noted that in this readjustment of the phase the phase shifting network 35 is untouched.

In Fig. 6, the circuits are substantially like those of Fig. 5 except that a different kind of bridge network is disclosed and two indicators are provided for simultaneous observation of both admittance components. Also the imaginary component indicator 17 is arranged for limit detector operation in accordance with the invention disclosed and claimed in the aforementioned copending application. The bridge network 1 has test terminals 6 to which the unknown admittance may be connected. The standard components $G_s$ and $C_s$ are arranged in a differential network between bridge terminals A, C and D and are operated in the manner described in United States Patent 2,309,490 granted to C. H. Young November 26, 1943. The output of the bridge is amplified by an alternating-current amplifier 15 which may also contain a limiter of conventional design. The limiter may be of the type disclosed in United States Patent 1,200,796 (Re. 14,585) granted to H. D. Arnold October 10, 1916, or it may be of the type disclosed in United States Patent 2,079,485 granted to H. W. Bousman May 4, 1937. These limiters are essential if sensitive galvanometers are used for indicators 16, 17 and the null indicator in order to prevent injury to them when large unbalances occur. The phase detector 7 corresponds with the phase detector 7 of Fig. 5 and has input terminals 9 and 10. The output of this phase detector is amplified by the direct-current amplifier and applied to the real component indicator 16. The phase detector 8 is identical with detector 7 and has input terminals 11 and 12 corresponding with input terminals 9 and 10 of detector 7. Its output is amplified with the direct-current amplifier and applied to a zero center instrument 17 of the same type as used for indicator 16. The reference voltage is derived in the same manner as previously described for Fig. 5 and is applied to the input terminals of the phase shifter 35. Since in this case two phase detectors 7 and 8 are employed, the phase shifter 35 should provide two outputs displaced 90 degrees in phase which are amplified by amplifiers 37 and 37' and applied to input terminals 10 and 12 of phase detectors 7 and 8, respectively. Phase shifter 35 may be constructed along well-known lines. However, for the sake of completeness, one form of phase shifter will be described later in connection with Fig. 7 which can be used in this circuit.

The limit detector operation afforded by switch 19 and limit element 20 is the subject-matter of the aforementioned copending application. However, for the purposes of this disclosure, it may be described briefly. Block 20 refers to an adjustable complex circuit element. Terminals 21 thereof are connected to test terminals 6 in the measuring bridge arm through conductors 22 and 23. With this connection the complex circuit element in block 20 is arranged for addition to the complex circuit element under test. The switch in block 20 will connect the adjustable circuit element $C_L$ to the bridge and for convenience this switch is mechanically linked through a linkage 24 to the reversing switch 19.

In using this limit detector feature, it is assumed that the bridge has been given its preliminary balance in accordance with conventional methods. This is usually done by setting the standard to zero and without any complex element connected to the test terminals 6, various trimmers (not shown in the figure) are adjusted until the bridge shows a complete balance for both components. In making these adjustments, the adjustable circuit element $C_L$ in block 20 must also be disconnected from the bridge. The adjustable complex element $C_L$ is thereafter again connected to the bridge and adjusted to equal the maximum range of deviation which will be permitted of the reactive component to be tested. The reactive component of the standard is then adjusted to read the maximum value to be measured. Now it is assumed that when the switch 19 is moved to the "min." position, the galvanometer 17 is so connected to its phase detector that it will give a positive deflection when the reactive component of the standard is less than the corresponding component in the C—D arm of the bridge, including of course the adjustable circuit element $C_L$ in block 20. This completes the adjustments of the circuit and it is now ready for production testing of a large number of similar complex circuit elements.

The testing operation is performed by simply connecting the complex circuit element to the test terminals 6 of the bridge and operating the reversing switch 19, first to its upper ("min.") position and then to its lower ("max.") position while at the same time operating through linkage 24, the switch in block 20. If the deflection of the galvanometer 17 is positive for each of the two positions of the switches, the reactive component of the circuit element under test lies within the prescribed limits. If, in either position of the switches, the indicator shows a negative deflection, the reactive component is outside of prescribed limits. As disclosed in the aforesaid copending application, the real component may also have a reversing switch and a real component adjustable element in block 20 so that similar limits may be set up for the real component.

Switch 38 is provided for switching between the two terminals labeled "Auto" and "Man," designating "automatic" and "manual" operation, respectively. In the automatic position as shown in Fig. 6, the apparatus is operated as already described. When the switch 38 is moved to its manual position, the phase detector operates as a conventional phase detector circuit without employing the features of this invention. In this position it will be observed that transformer 34 is connected directly across output resistor 32 of vacuum tube $V_1$ and consequently receives a voltage proportional to the supply voltage across the input terminals of bridge 1, rather than the vector difference between the two voltages specified as the necessary requirement for the practice of this invention.

In the arrangement specifically shown in Fig. 6, the apparatus is particularly adapted for the measurement of air and mica condensers. As the resistive (conductive) component of such condensers varies throughout only a very narrow range, the requirements of Equation 15 are met for automatic phase adjustment. It will also be observed that if the switch 19 is left in the position shown in Fig. 6, the limit capacitor $C_L$ in block 20 is disconnected from the bridge circuit. In this position of switch 19, the actual capacitance and conductance of the condenser connected to terminals 6 may be measured by adjusting the conductance and capacitance components in the standard until a null indication on both the real component indicator 16 and the imaginary component indicator 17 is observed. If either of the indicators 16 or 17 fails to read zero, the corresponding standard components should be adjusted to give a minimum deflection. Then, by adjusting slider 31 to again indicate a minimum deflection, the reference voltage phase should be correctly adjusted and upon further adjustment of the standard components in the bridge, a zero deflection on both instruments should be reached. Of course the null indicator should also indicate zero deflection at this time.

Fig. 7 discloses circuits which may be employed as the phase shifting network 35 of Figs. 5 and 6. In this figure, the output of transformer 34 of Figs. 5 and 6 is applied to two conventional phase shift networks 40 and 41 connected in series. The four-position switch under control of knob 42 connects the four terminals on equal resistor network 43 in various combinations about the four output terminals 44, 45, 46 and 47 of the phase shift networks 40, 41. It will be evident that the phase of the voltages between phase control sliders $\Phi_R$ and $\Phi_I$ to ground will both be shifted 90 degrees in phase as knob 42 is switched successively from one position to the next. It is also obvious, from merely tracing out the circuit, that a continuous phase adjustment is obtained by moving sliders $\Phi_R$ and $\Phi_I$ from one end to the other of their associated potentiometer resistors. With this arrangement it is possible to get any phase adjustment desired and the two output voltages may be easily adjusted to exact quadrature. It should be again emphasized that once this adjustment is made with the phase shifter 35, all subsequent phase adjustments may be made by slider 31 of potentiometer 30.

The circuit arrangement is shown in Fig. 8 for utilizing the $\overline{M_r}$ voltage along the reactive axis of Figs. 3 and 4 in the manner previously described. It will be remembered that in order to use such a voltage, it will be necessary to shift its phase by 90 degrees. This is provided by the 90-degree phase shifter 50, the output of which is amplified by amplifier 51 and applied to the grid of tube $V_1$. The manner in which this circuit is connected into either Fig. 5 or Fig. 6, will become obvious by comparing the circuit configurations and reference numerals.

While for illustrative purposes the invention has been described in connection with some particular bridge circuits, it is quite obvious that the invention is not restricted to the particular bridge circuits disclosed. The circuit analysis is quite general and may be applied to most any alternating-current bridge circuit. Therefore, all of the embodiments disclosed herein should be regarded as illustrative only and not of a restrictive nature.

What is claimed is:

1. A phase-sensitive bridge balance detector for an alternating-current bridge, said bridge having input and output terminals and a source of alternating current connected to its input terminals, said detector comprising a variable voltage control for connection to the source of alternating current, an output circuit for said voltage control, a voltage subtraction circuit connected to the voltage control output circuit and also having a terminal for connection to one of the output terminals of the bridge, whereby a reference voltage is derived proportional to the vector difference between the potential of said voltage control output circuit and the potential of said bridge output terminal, a phase-sensitive detector having two pairs of input terminals and one pair of output terminals, a circuit for connecting one of the pairs of input terminals to the bridge output terminals, another circuit for connecting the other pair of input terminals to the voltage subtraction circuit to receive the derived reference voltage therefrom, and an indicator connected to the output terminals of the phase-sensitive detector whereby the indicator may be made sensitive to only one component of the bridge output voltage.

2. The combination of claim 1 wherein the voltage subtraction circuit comprises two electron discharge tubes, each having at least an anode, a cathode and a control electrode, a circuit connecting the two anodes together, an output impedance connected between the two cathodes, a circuit connecting one of said control electrodes to the voltage control output circuit, and another circuit connecting the other control electrode to said terminal for connection to one of the bridge output terminals.

3. The combination of claim 1 and a phase shift network included in the circuit connecting the said other pair of input terminals of the phase-sensitive detector to the voltage subtraction circuit, whereby a preliminary phase shift may be provided to correct for amplifier and other fixed phase shifts in the system.

4. A phase-sensitive bridge balance detector for an alternating-current bridge, said bridge having input and output terminals and a source of alternating current connected to its input terminals, said detector comprising a variable voltage control for connection to the source of alternating current, an output circuit for said voltage control, a 90-degree phase shift network connected to said voltage control output circuit to shift the phase of the voltage derived from said voltage control, a voltage subtraction circuit connected to said 90-degree phase shift network to receive the shifted voltage therefrom and also having a terminal for connection to one of the bridge output terminals, whereby a reference voltage is derived proportional to the vector difference between the potential derived from said voltage control output circuit and the potential of said bridge output terminal, a phase-sensitive detector having two pairs of input terminals and one pair of output terminals, a circuit for connecting one of the pairs of input terminals to the bridge output terminals, another circuit for connecting the other pair of input terminals to the voltage subtraction circuit to receive the derived reference voltage therefrom, and an indicator connected to the output terminals of the phase-sensitive detector, whereby the indicator may be made sensitive to only one component of the bridge output voltage.

5. The combination of claim 4 wherein the voltage subtraction circuit comprises two electron discharge tubes, each having at least an anode, a cathode and a control electrode, a circuit connecting the two anodes together, an output impedance connected between the two cathodes, a circuit connecting one of said control electrodes to the 90-degree phase shift network, and another circuit connecting the other control electrode to said terminal for connection to one of the bridge output terminals.

6. The combination of claim 4 and a phase shift network included in the circuit connecting the said other pair of input terminals of the phase-sensitive detector to the voltage subtraction circuit, whereby a preliminary phase shift may be provided to correct for amplifier and other fixed phase shifts in the system.

7. A phase-sensitive bridge balance detector for an alternating-current bridge, said bridge having input and output terminals and a source of alternating current connected to its input terminals, said detector comprising a variable voltage control for connection to the source of alternating current, an output circuit for said voltage control, a voltage subtraction circuit connected to the voltage control output circuit and also having a terminal for connection to one of the output terminals of the bridge, whereby a reference voltage is derived proportional to the vector difference between the potential of said voltage control output circuit and the potential of said bridge output terminal, two phase-sensitive detectors, each having two pairs of input terminals and one pair of output terminals, a circuit for connecting one of the pairs of input terminals of each phase detector to the bridge output terminals, a first circuit including a phase shift network for connecting the other pair of input terminals of one of the phase detectors to the voltage subtraction circuit, a second circuit also including a phase shift network for connecting the other pair of input terminals of the other phase detector to the voltage subtraction circuit, whereby a reference voltage is received by each phase detector from the voltage subtraction circuit, the phase of each being displaced 90 degrees with respect to the reference voltage received by the other phase detector, an indicator connected to the output terminals of one of the phase detectors responsive to the real component of bridge output voltage, and another indicator similarly connected to the other phase detector so as to be responsive to the imaginary component of bridge output voltage.

BOGUMIL M. WOJCIECHOWSKI.

REFERENCES CITED

The following references are of record in the file of this patent:

UNITED STATES PATENTS

| Number | Name | Date |
|---|---|---|
| 1,660,405 | Affel | Feb. 28, 1928 |
| 1,847,127 | Mayer | Mar. 1, 1932 |
| 2,109,325 | Thal | Feb. 22, 1938 |
| 2,117,462 | Thal | May 17, 1938 |
| 2,394,892 | Brown | Feb. 12, 1946 |